United States Patent [19]

Constant

[11] Patent Number: 5,043,903
[45] Date of Patent: Aug. 27, 1991

[54] SYSTEM FOR AIDING THE MOVEMENT OF MOVING UNITS IN GROUP FORMATION

[75] Inventor: Claude Constant, Rambouillet, France

[73] Assignee: Thomson CSF, Puteaux, France

[21] Appl. No.: 443,957

[22] Filed: Dec. 1, 1989

[51] Int. Cl.$^5$ ............................................. G06F 15/50
[52] U.S. Cl. .................................. 364/460; 364/461; 342/31
[58] Field of Search ...................... 364/460, 461, 457; 342/29, 30, 31, 32; 340/961

[56] References Cited

U.S. PATENT DOCUMENTS

| | | | |
|---|---|---|---|
| 2,476,301 | 5/1943 | Jenks | 244/3 |
| 3,153,232 | 9/1969 | Fletcher et al. | 342/29 |
| 3,310,806 | 4/1963 | Stansbury | 342/455 |
| 3,434,141 | 12/1967 | Welti | 342/29 |
| 3,560,991 | 2/1971 | Beisel, Jr. et al. | 342/36 |
| 3,573,818 | 4/1971 | Lennon, Jr. et al. | 342/31 |
| 3,581,309 | 5/1971 | Shear et al. | 342/31 |
| 3,737,901 | 6/1973 | Scott | 342/36 |
| 3,801,979 | 4/1974 | Chisholm | 342/31 |
| 4,063,073 | 12/1977 | Strayer | 364/439 |
| 4,197,538 | 6/1978 | Stocker | 342/32 |
| 4,232,313 | 9/1972 | Fleishman | 342/36 |
| 4,710,774 | 12/1987 | Gunny | 342/455 |
| 4,839,658 | 6/1989 | Kathol et al. | 342/455 |

FOREIGN PATENT DOCUMENTS

1544305  9/1968 France.

Primary Examiner—Thomas G. Black
Attorney, Agent, or Firm—Cushman, Darby & Cushman

[57] ABSTRACT

A system for aiding the movement of moving units (aircraft such as helicopters) when flying in formation. Every unit transmits information to every other unit so that bidirectional communication links are established between all units in the formation. Information indicative of the relative position between units is exchanged via the bidirectional communication links such that every unit has redundant position information pertaining to the position of every other unit. By a "data fusion" process performed on the redundant information, every unit accurately determines the position of every unit in the formation. One of the units (the "leader") then transmits "commands" to the other units (the "slaves"). Each command determines the position of a slave within the formation. Utilizing the command transmitted to it by the leader, and utilizing predetermined laws of pilotability, each slave then generates "piloting orders" for directing itself to the position commanded by the leader. These piloting orders may be supplied to an autopilot for automatic control the formation. The distance quantity of the relative position between units may be determined based on the travelling time of the transmissions of the bidirectional communication links between units. The direction quantity of the relative position may be determined based on the detected direction from which the transmission of the bidirectional communication links originated.

14 Claims, 8 Drawing Sheets

SYSTEM FOR AIDING THE MOVEMENT OF MOVING UNITS IN GROUP FORMATION

BACKGROUND OF THE INVENTION

1. Field of the Invention

This invention relates to a system for aiding the movement of moving units in group formation. More particularly, this invention relates to a method and apparatus for directing the flight of aircraft (especially helicopters) in formation flying.

2. Description of the Prior Art

The transfer of a large number of helicopters from a given base to a distant base takes a long time due to the fact that the helicopters are transferred one by one. This slow transfer of helicopters is necessary as a safety measure due to the fact that the transfer often occurs under conditions of poor visibility, e.g. in the presence of fog or at night.

The helicopters to be transported are typically grouped into formations of five to ten helicopters each. Each such formation typically involves a guide helicopter called the "leader" and the other "slave" helicopters. The slaves fly behind the leader in given positions relative to the leader and relative to each other. The leader flies in such a way as to maintain a given spacing between that leader's formation and other formations.

Within each formation, the relative positioning of the helicopters is controlled to avoid collisions. Although it is desirable to maintain tight formation spacing in order to allow the transfers to be carried out in a small amount of time, formation spacing must be loose enough to account for anticipated deviations of individual helicopters from their desired positions. Therefore, due to the recognized danger and due to the difficulty of maintaining controlled spacing, group formation transfers now are generally carried out under conditions of good visibility and in visual flight.

An object of this invention is to provide a method and an apparatus for facilitating a rapid and safe transfer of a number of helicopters by allowing multiple groups of helicopters to travel simultaneously in safe formations. Another object of the invention is allow formations of helicopters to fly safely in conditions with poor visibility. Another object is to provide a system wherein the configuration of the formation varies over time in a predetermined way.

SUMMARY OF THE INVENTION

Multiple apparatuses, one apparatus in each helicopter of the formation, comprise the system. Each apparatus of each helicopter determines the relative position of each other helicopter. This relative information is then exchanged between apparatuses so that the accuracy of the redundant position information can be checked. Using this checked relative position information, the apparatus of the leader helicopter then generates "commands" dictating a commanded position, heading, speed, and altitude of each slave helicopter. When these "commands" are received by the slaves, the slaves calculate "piloting orders". These piloting orders are the actual headings and speeds required of each slave to achieve its commanded position, heading, and speed. The calculation of the piloting orders is governed by predetermined rules of pilotability so that predetermined margins of safety are maintained and so that the danger of collisions is reduced. The piloting orders are then supplied to either the slave's pilot or autopilot.

According to the invention, each helicopter has a electromagnetic transmission means which allows each helicopter to determine the relative position of each other helicopter in the formation. The electromagnetic transmission means allows the arrival time and direction of transmissions to be determined. From the arrival time, the travelling time of the wave between transmitting helicopter and receiving helicopter is determined. The relative distance between helicopters is then determined from the wave's travelling time.

The spectral density of the error in the relative position information is then determined via a "data fusion" calculation. The impact of flight phase (quasi-stationary formation, spreading of the formation, rapidly variable formation, etc.) on the error in the relative position information is also taken into account.

Furthermore, each helicopter may carry a means for determining the absolute position of that helicopter. Modern helicopters have numerous transducers, sensors, and measuring devices which supply information about the helicopter's absolute position in relation to a ground reference point, speed, heading, and altitude. This information generally comes from an Inertial Navigation System or from systems such as a Global Positioning System (GPS), DECCA, OMEGA, TRANSIT, etc. If absolute position information is available, the "data fusion" calculation will also take into account the impact of the absolute position on the figures of merit of the relative position.

The apparatus of the leader helicopter then uses the analyzed relative positions in calculating "commands" to the apparatus of each slave helicopter. These commands comprise a command position (angle from the leader and a distance from the leader), a commanded heading, a commanded speed, and a commanded altitude for each slave helicopter. The commands are computed in real time utilizing preprogrammed rules of piloting. The commands are computed with sufficient frequency that the system can control the flight path of each of the helicopters.

When the commands calculated by the leader are received by the slaves, the slaves calculate the actual heading and actual speed required to realize the commanded position, commanded heading, commanded speed, commanded attitude, and commanded altitude. The results of the slave's calculations, the "piloting orders", are executed using preprogrammed rules of pilotability. These piloting orders are then supplied to either the autopilot of the slave or to the pilot of the slave helicopter.

In one embodiment, however, the leader helicopter transmits only a commanded formation type. Because the slaves know the relative positions of helicopters in each type of formation, the slaves can calculate their commanded positions within the commanded type of formation.

BRIEF DESCRIPTION OF THE DRAWINGS

The features and advantages of the invention will be apparent from the following description, given by way of example, with the aid of the attached figures.

DESCRIPTION OF THE PREFERRED EMBODIMENT

Figure 1:
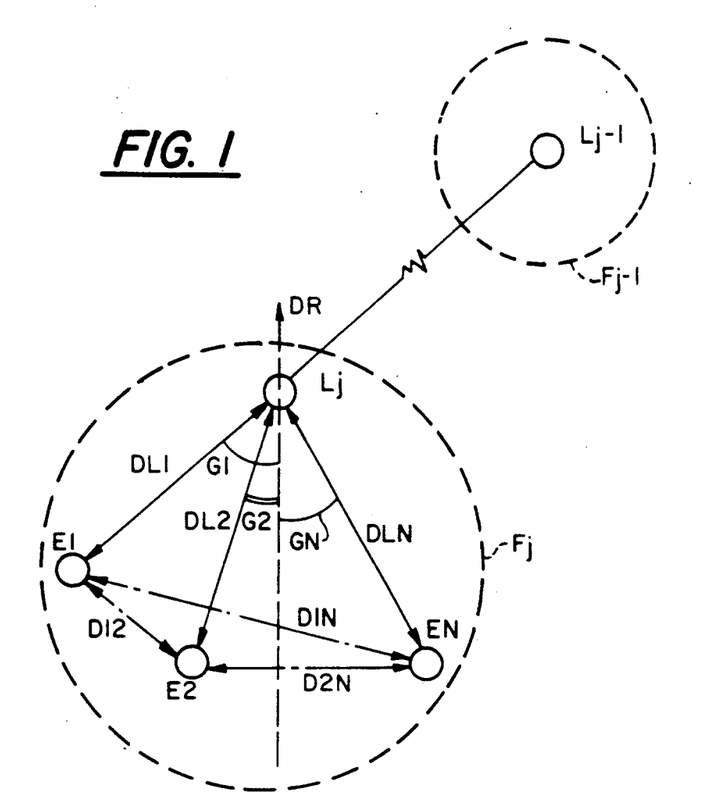
FIG. 1 is a diagram of two formations showing certain position data between helicopters.

FIG. 1 is a view looking down upon two formations of helicopters, formation Fj and formation Fj-1. Formation Fj comprises a certain number of helicopters N with a lead helicopter Lj. This formation is shown in relation to a leader Lj-1 of another formation Fj-1. Spacing between formations is controlled based on the distance separating the successive leaders Lj-1 and Lj. Furthermore, individual formations Fj-1 and Fj may be of different types. The leader of formation Fj could be an absolute leader whereas the leader of formation Fj-1 could be a relative leader.

In formation Fj, leader helicopter Lj determines both the route travelled by slaves E1, E2, and EN. Leader Lj therefore also determines the spatial positioning of slaves E1, E2, and EN within the formation. The spatial positioning of the slaves relative to the leader has three components: 1) the distances between the leader and the various slaves DLj, 2) the bearing angles between a reference direction DR and the directions to the various slaves Gj, and 3) the site angles from the leader to the various slaves Sj.

FIG. 1 is a view looking down on formations Fj and Fj-1. This figure shows distances DLj, reference direction DR, and bearing angles Gj. Site angles are not shown in FIG. 1 in order to simplify the representation.

Figure 2:
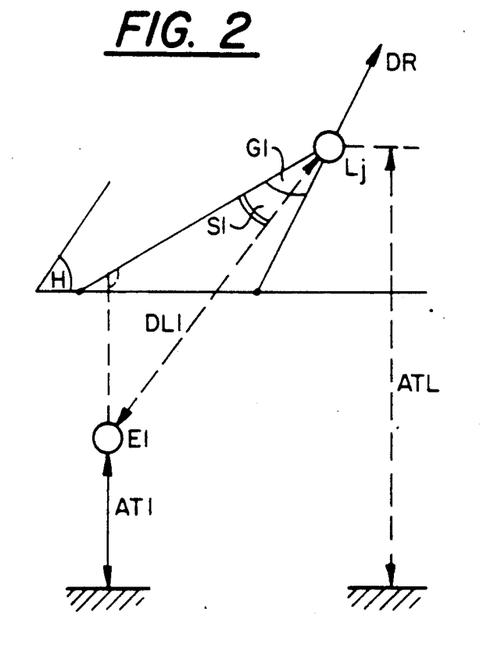
FIG. 2 is a side view of two of the helicopter of FIG. 1.

FIG. 2, on the other hand, is a side view of two helicopters of formation Fj. FIG. 2 shows site angle S1 from leader Lj to slave E1 where leader Lj at a higher altitude than slave S1. Leader Lj is depicted at altitude ATL where slave E1 is depicted at altitude AT1. It is therefore understood that the moving units can be at different altitudes.

Not only are the distances between the leader and the slaves used in the positioning of the moving helicopters, but also the distances between a slave and each of the other slaves are also used. Reference D12 on FIG. 1 is the distance between slave E1 and slave E2. The distance between slave E1 and slave EN is denoted as D1N. The distance between slave E2 and slave EN is denoted as D2N.

The spatial positioning of helicopters within the formation is predetermined taking into account a minimum safety distance between helicopters. Specific parameters taken into account include the speed, the heading, and the attitude of each helicopter.

As was previously stated, the measuring devices provided in the moving unit, in particular the sensors, output data indicative of the absolute position of the moving unit in relation to a ground reference point.

FUNCTIONAL BLOCKS

Figure 3:
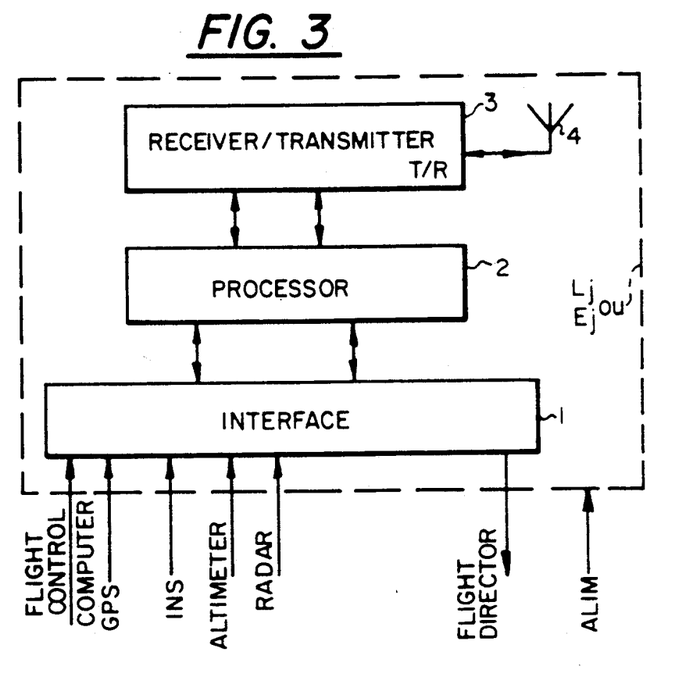
FIG. 3 is a functional block diagram of the apparatus on board each helicopter.

FIG. 3 is a block diagram of the apparatus for aiding the movement of moving units. The apparatus is comprises I/O interface 1, processor 2, receiver/transmitter 3, and antenna 4. The I/O interface receives signals from various measuring devices and sensors and supplies these signals to processor 2. I/O interface 1 also outputs processor computations onto the depicted flight director output. These processor computations are used by either the pilot or the autopilot to maintain the desired spatial positioning within the formation. Antenna 4 receives data from and transmits data to other helicopters. Receiver/transmitter 3 couples antenna 4 to processor 2.

Processor 2 receives information from receiver/transmitter 3 and I/O interface 1, processes this information in accordance with a preestablished calculating process, and outputs information to receiver/transmitter 3 and to I/O interface 1. Processing involves data fusion, the calculation of the relative positions of the other helicopters, and the generation of messages to be transmitted.

Figure 4:
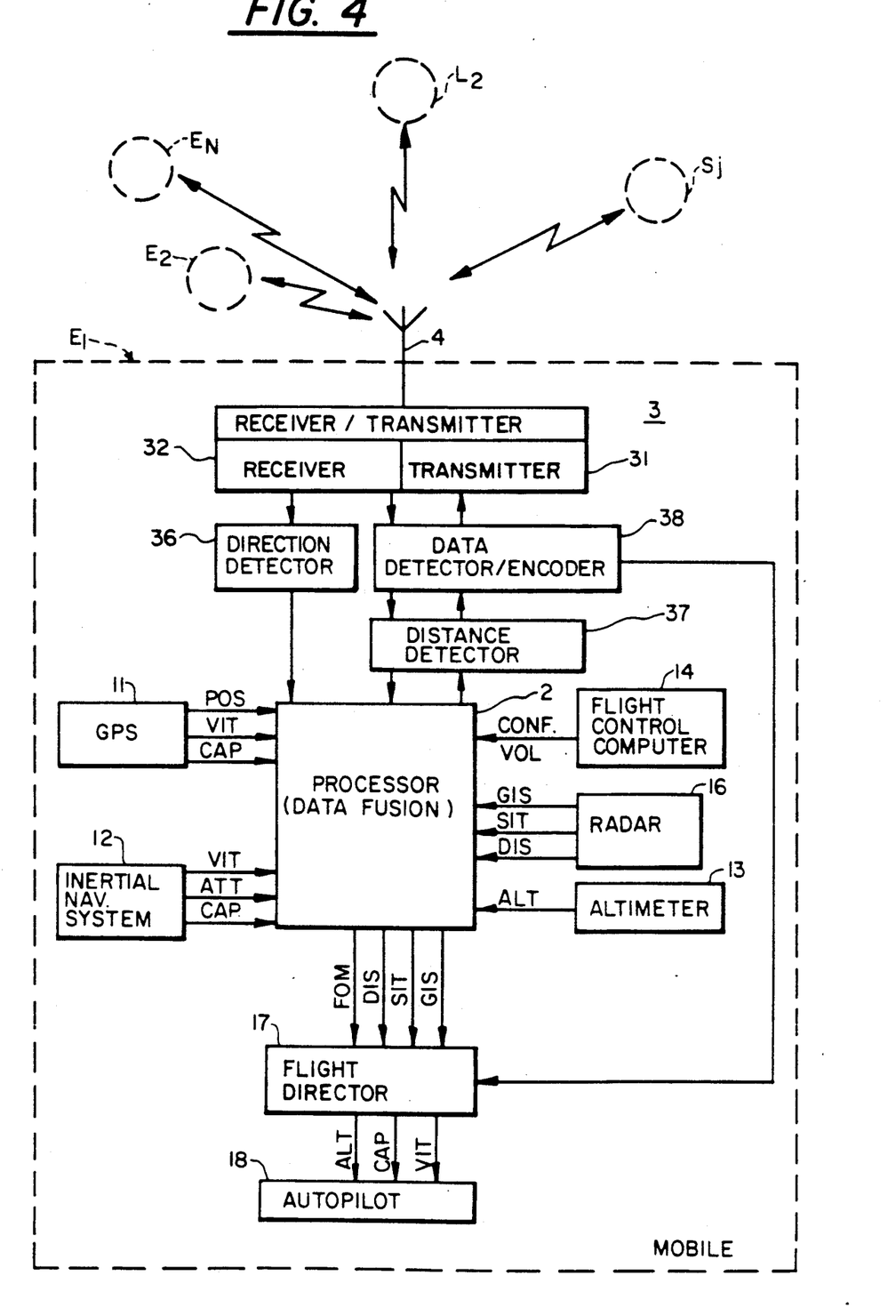
FIG. 4 is a functional block diagram of the apparatus of FIG. 3 showing the sources of input data and showing the receiver/transmitter in more detail.

FIG. 4 shows the origins of the information processed by processor 2. The signals are shown going directly into processor 2 (I/O interface 1 is not depicted). Global Positioning System (GPS) 11 supplies the absolute position, absolute speed, and a figure of merit pertaining to its output signals. Inertial Navigation System (INS) 12 supplies the absolute speed, attitude, heading, and a figure of merit pertaining to its output signals. Altimeter 13 supplies the altitude. Flight Control Computer (CBD) 14 supplies the current flight configuration of the helicopter. Radar Unit 16 supplies the relative distances to the other helicopters, the bearing angles to the other helicopters, and the site angles to the other helicopters.

FIG. 4 also shows Receiver/Transmitter 3 in more detail. Receiver/Transmitter 3 comprises receiver 32 and transmitter 31. Functionally, a direction detector 36, a distance detector 37, and a data detector/encoder 38 are also included. Via antenna 4, receiver/transmitter 3 transmits information to other helicopters. This information comprises heading, speed, absolute position, altitude, bearing angle, site angle, relative distance, and associated figures of merit. Receiver/transmitter 3 also receives the same types of information from the other helicopters via antenna 4. Transmitter 31 is capable of 0.1 to 10 Watt transmissions. Receiver 32 is capable of reception in either the L frequency band or in the S frequency band.

FIG. 4 shows that the outputs of processor 2 which go to flight director 17 of FIG. 3 actually comprise a relative bearing angle to another helicopter, a relative site angle to another helicopter, a relative distance to another helicopter, and associated figures of merit. Flight director 17 then transforms this relative position data into commands adapted for controlling autopilot 18. Speed, heading or route, and altitude, are output from flight director 17 taking into account the commands given by the leader via the data link.

The signals input into processor 2 exhibit well defined spectral error characteristics. They may be sampled at a typical sampling rate. In addition, signal inputs into processor 2 from measuring devices and sensors may be supplied in a redundant fashion.

Most importantly, at any given instant in time, the information present in a formation is redundant and may vary over time as a function of scrambling, voluntary jamming, involuntary jamming, intermittent transmissions, radioelectric masks, breakdowns, degraded performance, et cetera.

Figure 9:
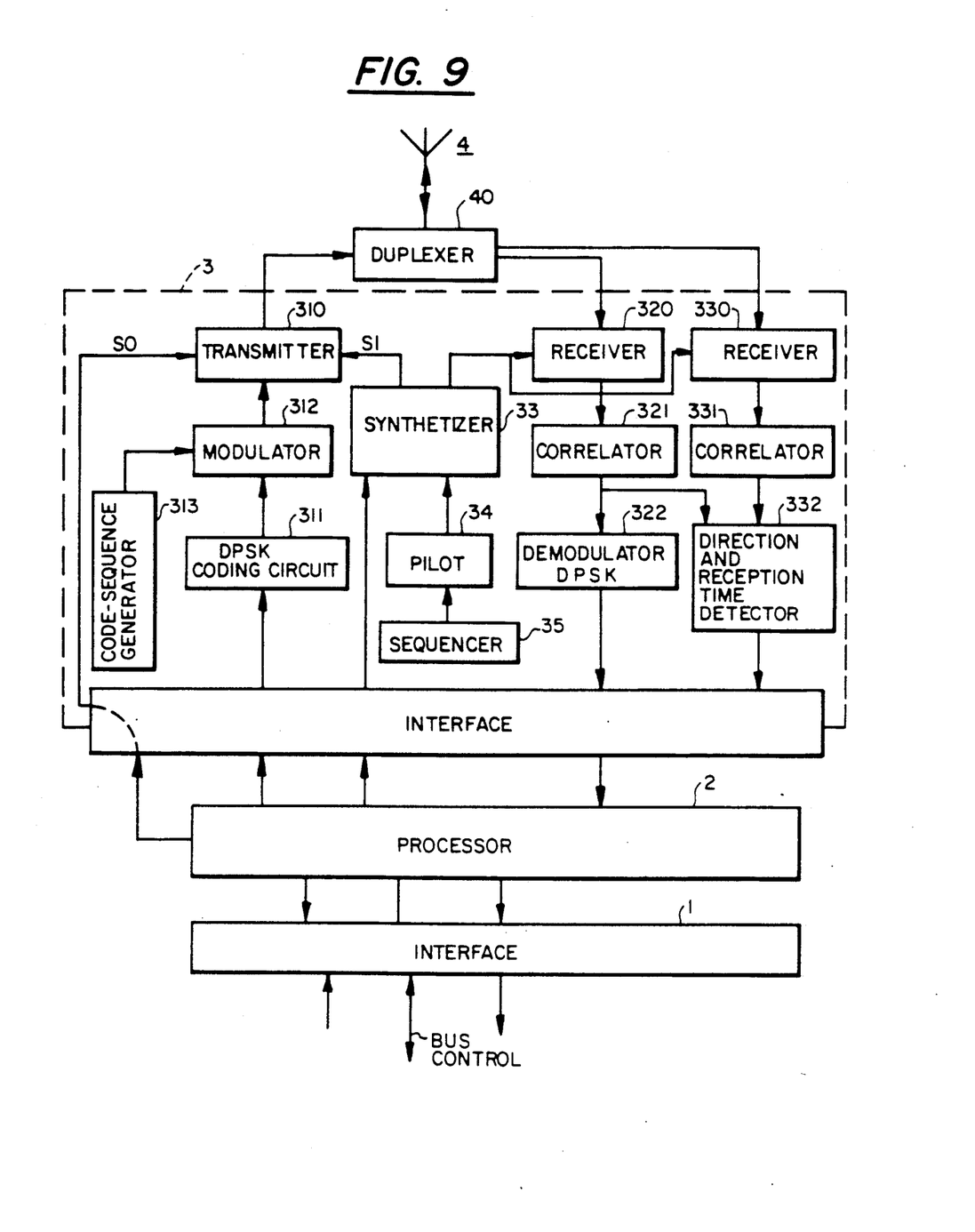
FIG. 9 is function block diagram of the apparatus of FIG. 4 showing the receiver/transmitter in still more detail.

FIG. 9 is a block diagram of the apparatus of FIG. 3 showing the receiver/transmitter portion in more detail. The transmitter portion of receiver/transmitter 3 is composed of transmitter 310, modulator 312, DPSK coding circuit 311, and code-sequence generator with pseudo-random spread 313. In operation, coding circuit DPSK 311 generates a differential phase shift keyed output bit stream based on the information to be transmitted. This coded information is supplied to modulator 312 along with a pseudo-random code supplied by code-sequence generator 313. Modulator 312 outputs a spread spectrum modulation of the information to be transmitted. Transmitter 310 then transmits this information. Transmitter gain is controlled by gain command SO received through the interface circuit. The transmitter receives signal S1 from synthesizer 33. Signal S1 corresponds to the frequency to transmit. Synthesizer 33 is under the control of pilot 34 and sequencer 35.

The receiver portion of receiver/transmitter 3 is composed of two receiver circuits, receiver 320 and receiver 330. Each receiver is followed by correlator. Correlator 321 processes the outputs of receiver 320 where correlator 331 processes the output of receiver 330. Correlator 321 is followed by Differential Phase Shift Key Demodulator 322. The demodulated information from the received transmission is output to the interface circuit for use by processor 2. The outputs of both correlators 321 and 331 are input into Direction and Reception Time Detector 332. The outputs of Direction and Reception Time Detector 332 are also output to the interface circuit for use by processor 2. Correlators 321 and 331 may incorporate delay lines. Duplexer 40 links transmitter 310, receiver 320, and receiver 330 to antenna 4.

Figure 13:
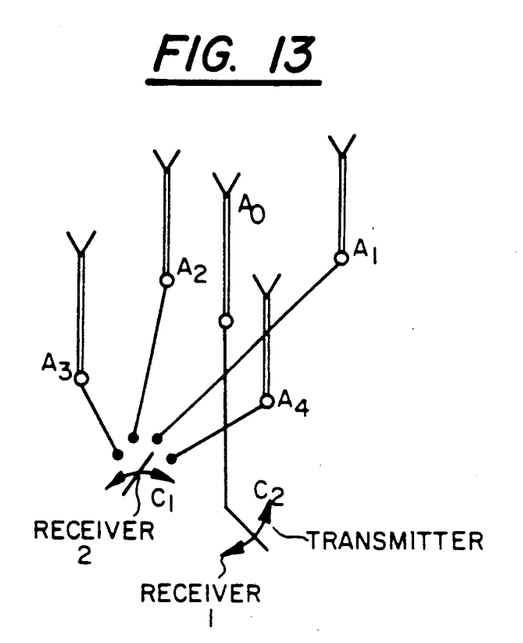
FIG. 13 is a diagram of the preferred embodiment of antenna 4.

As depicted in FIG. 13, antenna 4 (FIG. 9) comprises five identical antenna elements A0–A4. The plurality of radiating elements is coupled to a transmitter and to two receivers. Central element A0 serves as a reference. The four remaining elements A1–A4 are placed at the four corners of a square centered on central element A0.

Element A0 is coupled to either transmitter 310 or to one of the two receivers 320 or 330 by switch C2. The particular receiver is denoted as Receiver 1 in FIG. 13. Elements A1–A4 are sequentially coupled to the remaining receiver by switch C1. This second receiver is denoted as receiver 2 in FIG. 13. The connections between antenna elements A0–A4 and switches C1 and C2 are coaxial connections.

INFORMATION EXCHANGE BETWEEN HELICOPTERS

Figure 7:
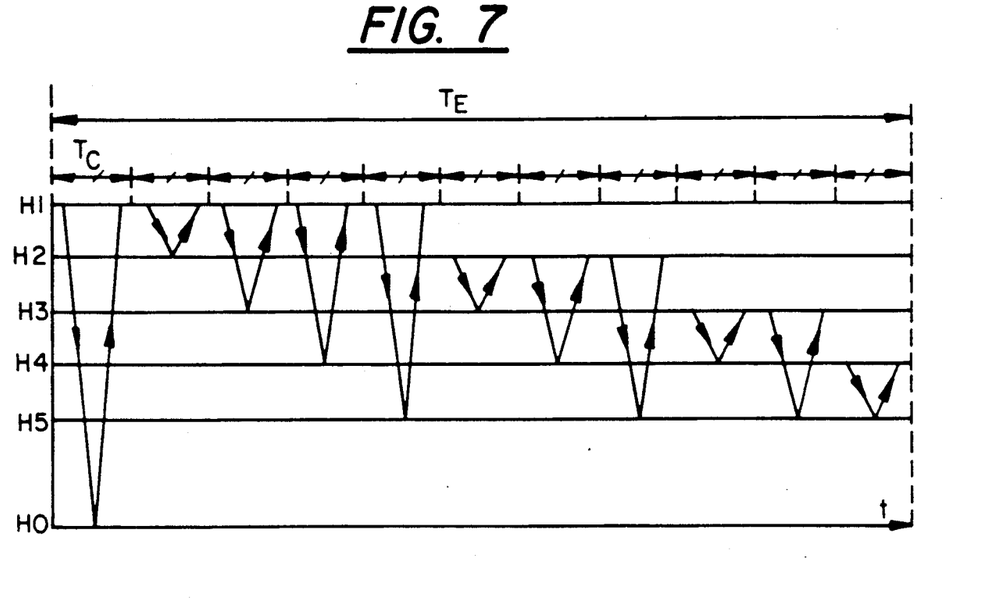
FIG. 7 is a diagram of one exchange frame of bidirectional communications between a formation of five helicopters.

FIG. 7 shows the communication scheme used in the formation. This communication scheme serves both to exchange information between helicopters and to determine the relative position information. Time progresses from left to right on the diagram. First, leader H1 transmits to H0 (the lead helicopter of another formation or a ground station). H0 then transmits back to leader H1. Leader H1 then successively relays information with each of slave of the formation, H2, H3, H4, and H5. Slave H2 then relays information with H3, H4, and H5. Slave H3 then relays information with H4 and H5. Finally, H4 relays information with H5. TE indicates the exchange frame which is the period of time required for bidirectional communication to be established between all the helicopters of the formation. TC indicates the duration of a cycle corresponding to a bidirectional communication between two helicopters. Thus, two way communication is established between every helicopter of the formation.

Figure 6:
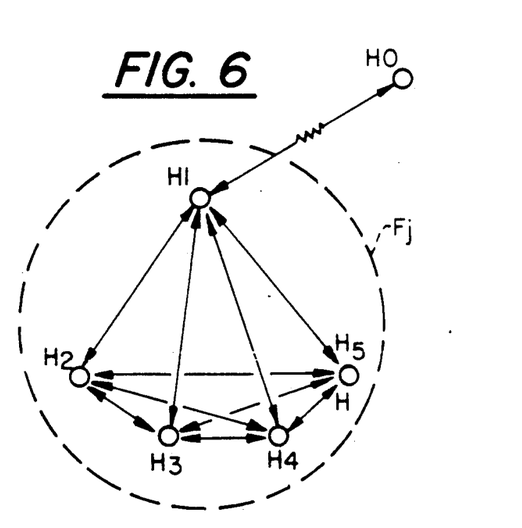
FIG. 6 is a diagram of a formation of five helicopters.

This scheme can, of course, be adapted for use in formations with other numbers of helicopters. For example, FIG. 6 shows a formation Fj with a reduced number of helicopters. Five helicopters H1, H2, H3, H4 and H5 are depicted as well as the 10 bidirectional communication links between them. In addition, communication between formation Fj leader H1 and the leader H0 of a neighboring formation (or a ground station) is shown.

Figure 8:
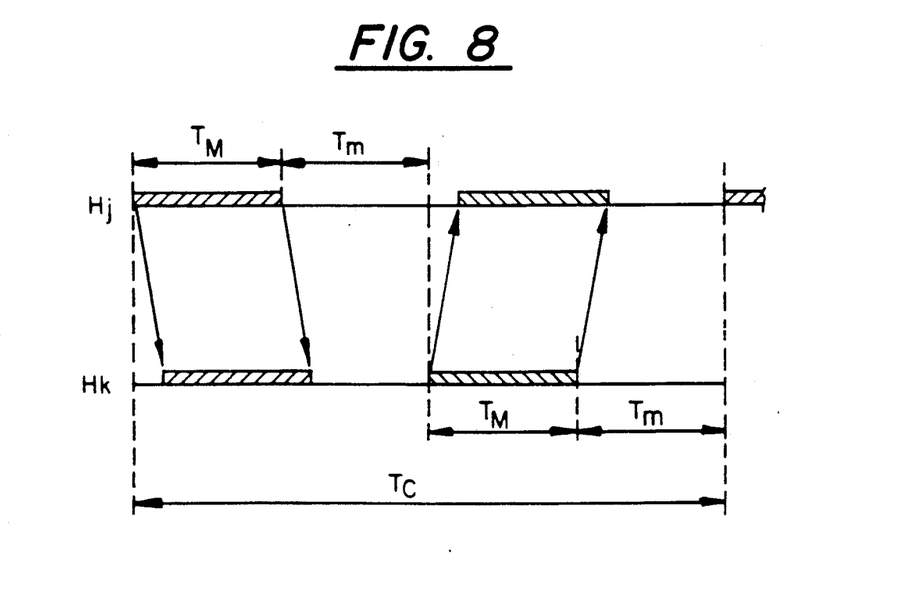
FIG. 8 is a more detailed diagram of one bidirectional communication between two helicopters of FIG. 7.

FIG. 8 is a more detailed view of one of the time periods TC in which bidirectional communication is established between two helicopters, Hj and Hk. FIG. 8 shows helicopter Hj making a transmission of duration TM to Helicopter Hk. Hk, however, receives this transmission an amount of time after the transmission was transmitted. This amount of time is the transmission time required for the signal to travel the distance from Hj to Hk. This transmission time is used to measure the distance between the two helicopters. Accordingly, each helicopter in the formation determines the distance between it and each of the other helicopters in the formation.

The transmission in the opposite direction from Hk to Hj occurs after a duration Tm. Tm is a time margin inserted to take into account a maximum transmission time between helicopters. Tm may correspond to a maximum helicopter separation of several tens of kilometers. Time period TC is not terminated immediately following the end of the transmission received by Hj. Rather, a cushion time is provided before the next time period TC begins due to the insertion of another time margin Tm. The duration of the message TM may be 0.57 ms, the duration of time margin Tm may be 0.52 ms, and the duration of time period TC may be approximately 2.2 milliseconds.

A TDMA (Time Division Multiple Access) synchronized network transmission scheme is used. The lead helicopter maintains the synchronization of all the helicopters controlling the timing of the exchange frame TE in a relaxed mode. Each slave helicopter synchronizes its exchange frame TE to that of the leader by setting its clock upon the reception of a synchronizing signal coming from the leader. Since the exchange frames of the participants of the network are synchronized, the including addresses in the transmitted messages is not required.

Transmissions are protected against jamming by spread spectrum techniques. For example, a spread spectrum code can be used in combination with a transmitter with servo-controllable transmitter power. Accordingly, sixty four 62 ns moments represent one bit of differential phase shift keyed (DPSK) transmitted information. Therefore, about 4 $\mu$s are required to transmit each bit. Individual messages, in turn, consist of sixteen 8-bit octets and a single parity bit. Each message, therefore, has a duration of approximately 0.6 ms.

The preferred embodiment supports a 10 helicopter formation with an exchange frame of 100 ms. The exchange frame is the amount of time required for all of bidirectional communications to occur one time. (A 100 ms exchange frame can also be referred to as a 10 Hz renewal cadence.) The lead helicopter of the supported 10 helicopter formation communicates with one helicopter of another formation or with a ground station. Accordingly, 46 bidirectional communications of at least 0.6 ms each occur per 100 ms exchange frame. (The number of bidirectional communications per exchange frame is also referred to as the dialogue capacity). The instantaneous transmission capacity of the system is 252 Kbits/sec., the average useful capacity is 103 Kbits/sec, the useful transmission capacity of a slave is 8.9 Kbits/sec., and the useful transmission capacity of the leader is 11.2 Kbits/sec.

Within individual transmissions, each octet is defined as transmitting one of the following types of information: formation synchronization, mode, speed, heading, GPS longitude position, GPS latitude position, figure of merit, relative distance (2 octets), relative bearing, merged distance (2 octets), merged bearing, figure of merit, altitude, and "check sum" (tests). An octet with formation synchronization information, for example, has eight bits of "1" as well as another bit of "1" for the parity bit. The parity bits of the remaining octets in the transmission are even.

INFORMATION PROCESSING

The flight of a helicopter is partitioned in the following "flight phases": placement in formation of a uniform, rectilinear flight after a take-off, stabilized flight, placement of the formation in a predetermined configuration, spreading procedure in the case of immediate danger, rallying of a distant slave, integration a slave into the formation, and landing of the formation.

Furthermore, the proper heading, the proper speed, the proper altitude, and the proper acceleration of helicopters depend upon the current flight phase. The errors of certain measuring devices and sensors are also a function of flight phase. For example, errors of the Global Positioning System (GPS) 11, errors of the Inertial Navigation System 12, and errors of the direction detector 36 are flight phase dependent.

Therefore, because the desired flight dynamics and trajectories are specific for each phase of flight, the processing of processor 2 is modified depending on the current flight phase. Specifically, the "operating mode" of a helicopter is changed by changing the content of an octet in a message transmitted to the helicopter. By manipulating the content of this octet in different flight phases, the processing of the information in the remainder of the message can be altered depending upon the current flight phase.

There are four such operating modes. Operating Mode 1 is used for the formation merge; Operating Mode 2 is used for station keeping; Operating Mode 3 is used in the landing phase; Operating Mode 4 affects communication with the ground control.

Processor 2 processes the positioning elements: Site angle, bearing angle, distance, and associated figures of merit. This processing is called the "data fusion" process. This process provides the flight director with the helicopter's relative position (distance, bearing, site) in relation to the leader helicopter along with an error characterized by a figure of merit. This process is carried out to minimize the error in the relative position determination and to maximize formation flight safety.

Figure 5:
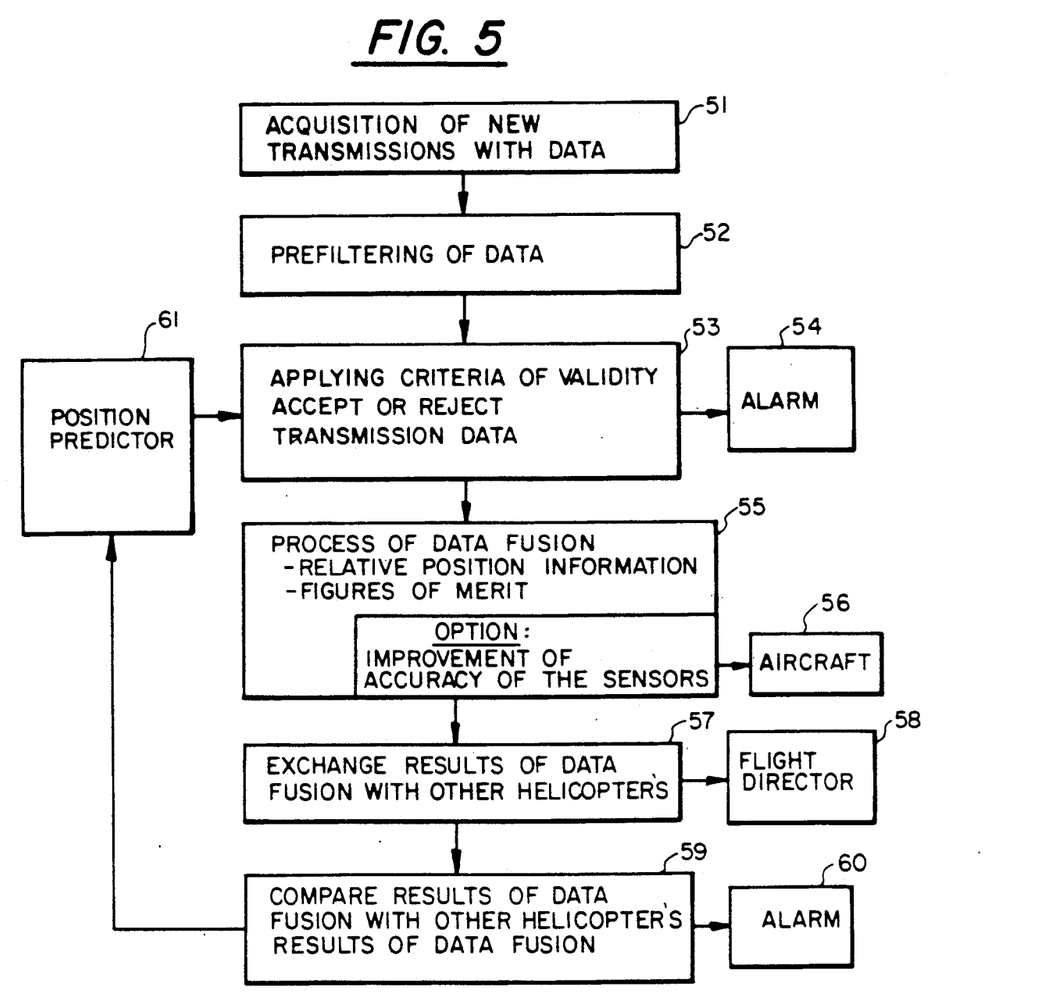
FIG. 5 is a flowchart involving the data fusion process.

The flowchart of FIG. 5 outlines data flow associated with the "data fusion" process. Data flow consists of the acquisition of new transmissions with new data (51), prefiltering of the data (52), applying criteria of validity to accept or reject the data (53), indicating an alarm if the data is invalid (54), initiating the data fusion process to output relative position information and associated figures of merit (55), exchanging the outputs of the data fusion process with other helicopters (57), controlling the this helicopter (56), supplying the outputs of the exchanged data fusion process to the flight director (58), comparing the results of the data fusion processes of other helicopters with the results of data fusion for this helicopter (59), indicating an alarm condition if the comparison is unfavorable (60), and determining the position of this helicopter (61). As shown in the subblock of block 55, there is an option in the "data fusion" process in which the systematic errors of the sensors are corrected by means of the result of the fusion of data provided by the different measuring devices. For example, the systematic errors of direction detector 36 are corrected with data from the GPS 11.

ACTUAL HARDWARE AND SOFTWARE IMPLEMENTATION

Figure 10:
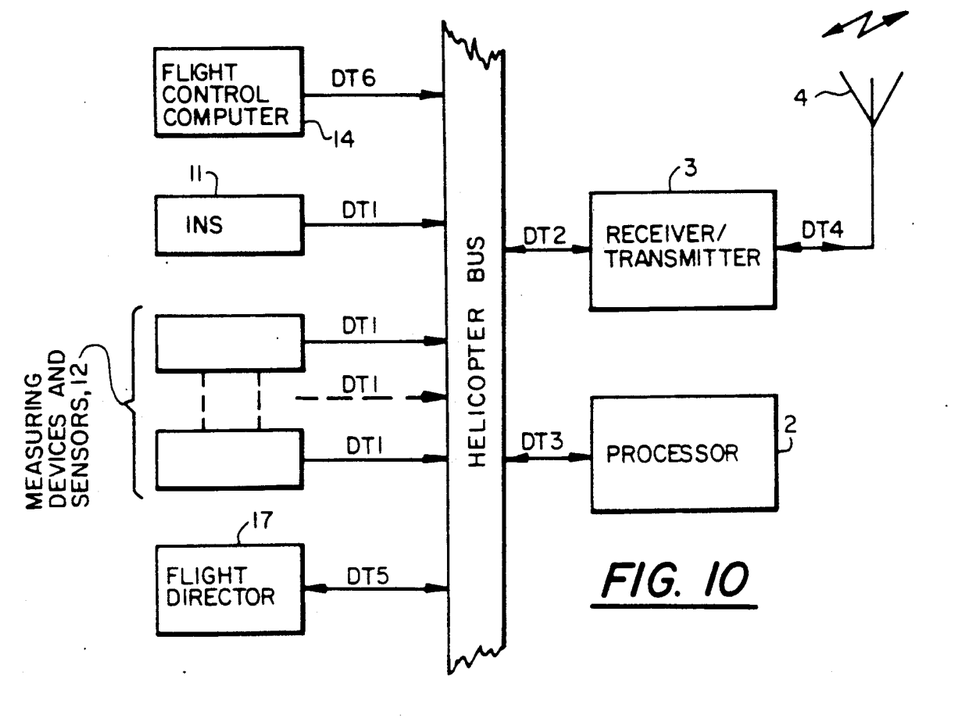
FIG. 10 is a diagram showing a physical partitioning of the apparatus of FIGS. 3, 4, and 9.

FIG. 10 shows a scheme for physically partitioning of the system functionally described above in FIGS. 3, 4, and 5. As shown in FIG. 10, Flight Control Computer 14, various measuring devices and sensors such as Global Positioning System 11 and Inertial Navigation System 12, Flight Director 17, Processor 2, and Receiver/Transmitter 3 exchange information via a helicopter bus. For simplicity, the bus interfaces of these elements are not shown. Processor 2 comprises a microprocessor, programmable read-only memory (PROM), read-write memory (RAM), interrupt controller, a clock, specific command recognition circuits, and specific command generation circuits.

The PROM content includes the program and information defining the particular sequence with which communications occur within the exchange frame. Data DT1 comes from various measuring devices and sensors on board the helicopter. Data DT4 comprises the data, the results, and the commands for the formation. Data DT5 comprises the piloting orders. Data DT6 comprises the flight configuration. Data DT2 comprises both data DT1 and data DT4. Data DT3 comprises data DT1, data DT4, data DT5, and data DT6.

In this embodiment processor 2 performs the "data fusion" process and outputs relative position information to flight director 17. Using the commanded position, commanded speed, commanded heading, and commanded altitude (received from data detector/encoder 38), and using the measured relative position, measured speed, measured heading, and measured altitude, flight director 17 calculates the error between the commanded values and the measured values. Using these calculated errors, flight director goes on to calculate piloting orders utilizing the laws of pilotability. These piloting orders are output to the pilot or autopilot so that the helicopter can be flown to it commanded position, speed, heading, and altitude.

Software running in processor 2 performs the following functions:

Reception of the information coming from the helicopter via the interface,

Processing of messages and their preparation (parity + "check sum") in conformity with a TDMA exchange grid (FIG. 7) defined in the read-only memories, Management of the gain command and of the transmission moments of the transmitter, Management of the transmission/reception frequency in the case of a data transmission with frequency hop (anti-jamming), Reception of messages coming from the receiver and monitoring of "check sum" and parity, Transmission of data received to the computer for the fusions of data via a bus, and Surveillance by incorporated Built-In Test Equipment (BITE) of the smooth operation of the electronic unit.

Softward functions which bring about the "data fusion" process, the calculation of error, and the calculation of piloting orders are the following:

Data-fusion processing of data coming from the formation and supplied by data-treatment systems 3, to determine the relative position (distance, bearing, and site) of a slave in relation to a leader and an associated figure of merit, Monitoring of the results two by two from the results coming from the formation and supplied by the data-transmission system, and Calculation and transfer of the orders supplied to automatic pilot PA from the results of the data fusion process and of the commands supplied by the leader via the data-transmission system, taking into account the predetermined laws of pilotability.

The piloting orders supplied to autopilot 18 are calculated by flight director 17. The piloting orders are the combined results of:

The relative command position for the given flight configuration,

The relative real position of the helicopters in the formation,

The heading, altitude and speed command coming from the leader,

And the laws of pilotability applicable to the particular type of aircraft.

It should be emphasized that the orders for compensating the trajectory given to the pilot must take into account the relative position of the other slaves in order to avoid a corrective maneuver which might result in a collision.

Figure 11:
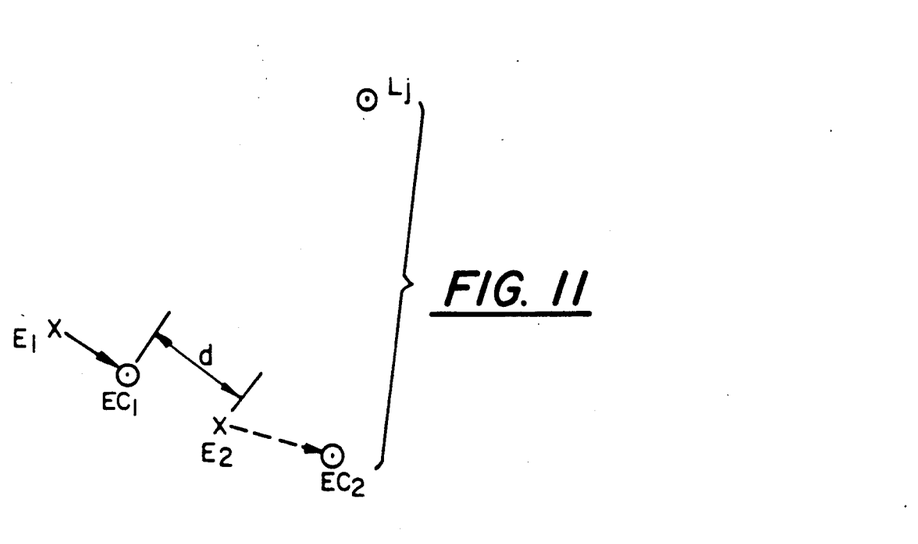
FIG. 11 depicts an example of the movement of slaves to commanded positions according to a law of pilotability.

FIG. 11 shows an example of the command positions of the leader Lj and of two slaves EC1, EC2. The placements E1 and E2 of the slaves correspond to the real positions at the instant considered. In this case of the figure, the distance "d" between the command position EC1 and the real position E2 is insufficient. Moving unit E1 must wait until moving unit 2 has corrected a part of its error so that distance "d" becomes compatible with a predetermined safety value. Only after achieving the predetermined safety value can moving unit E1 proceed with its maneuver for compensating command position EC1.

Figure 12:
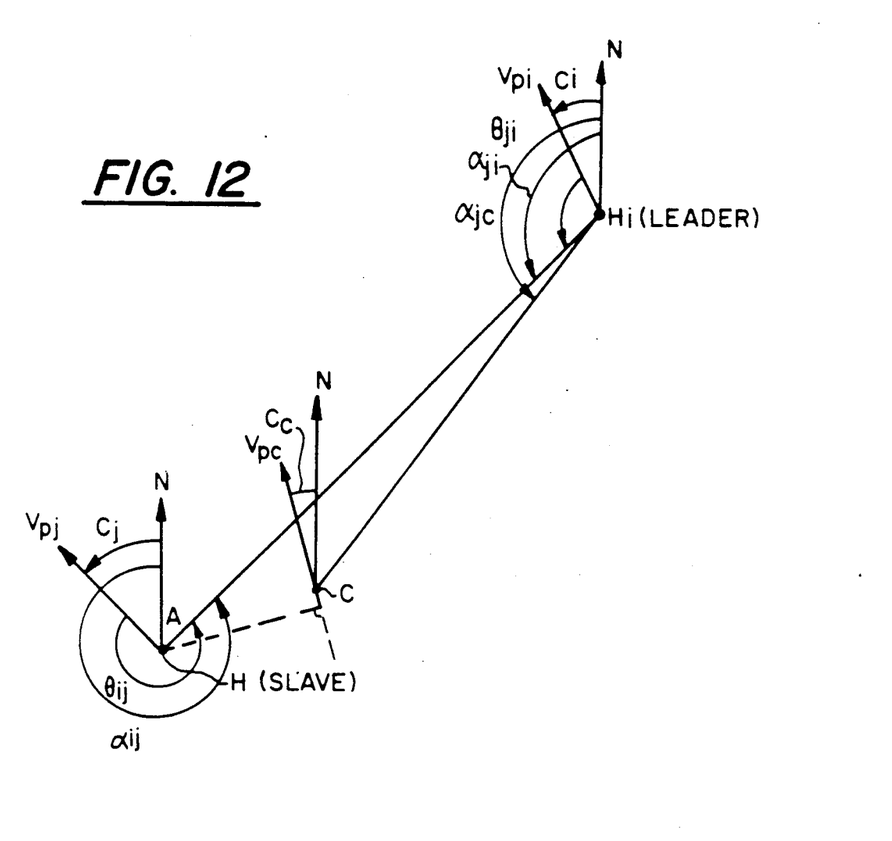
FIG. 12 depicts quantities used in an example of the calculating "piloting orders" according to the preferred embodiment.

FIG. 12 graphically depicts quantities used in the slave helicopter Hj's calculation of the heading error $\epsilon C$ and speed error $\epsilon Vp$. These errors, once determined, are used in the calculation of piloting orders to direct slave Hj toward the position commanded by leader helicopter Hi.

An example of one possible calculation of position error and speed error is outlined below. The calculation of relative position is performed in processor 2, whereas the subsequent calculation of error is performed in flight director 17. For clarity of explanation, this example only involves calculating the error in the trajectory of the slave helicopter in the horizontal plane. Although the leader helicopter transmits a commanded position in the example, it is to be kept in mind that the leader may simply transmit a formation type from which the slaves determine their commanded positions. This example does not cause the rules of pilotability to intervene.

The following variables are used in the calculation of errors:

$\epsilon C$ The heading error according to which slave Hj will fly in order to realize the commanded position, heading, and speed. This parameter is not depicted in FIG. 12.

$\epsilon Vp$ The velocity error according to which slave Hj will fly in order to realize the commanded position, heading, and speed. This parameter is not depicted in FIG. 12.

C Commanded position (composed of Djc and $\alpha jc$) which slave Hj has been commanded to assume by leader Hi.

Djc Command distance between command position C and leader Hi. This parameter is not depicted in FIG. 12.

$\alpha jc$ Angle from due north at which leader Hi determines slave Hj should be if Hj were at the commanded position C.

$C_c$ Command heading which slave Hj has been commanded to fly at commanded position C by leader Hi.

$V_{pc}$ Command speed at which slave Hj has been commanded to fly at commanded position C by leader Hi.

Ci Heading relative to due north flown by leader Hi.

Cj Heading relative to due north flown by slave Hj.

Vpj Speed at which slave Hj is flying in Cj direction.

Vpi Speed at which leader Hi is flying in Ci direction.

$\Theta ij$ Angle from flight direction Cj at which slave Hj determines leader Hi to be.

$\Theta ji$ Angle from heading Ci at which leader Hi determines slave Hj to be.

$\alpha ij$ Angle from due north at which slave Hj determines leader Hi to be. This angle is always $(Cj + \Theta ij)$.

$\alpha ji$ Angle from due north at which leader Hi determines slave Hj to be. This angle is always $(Ci + \Theta ji)$.

Dij Distance from slave Hj to leader Hi as determined by slave Hj. This parameter is not depicted on FIG. 12.

Dji Distance from leader Hi to slave Hj as determined by leader Hi. This parameter is not depicted on FIG. 12.

Via bidirectional communication such as that shown in FIG. 7:

Leader Hi transmits to slave Hj:

Ci, Vpi, $\Theta ji$, Dji, $\alpha jc$, Djc.

Slave Hj transmits to leader Hi:

$C_j$, $V_{pj}$, $\Theta_{ij}$, $D_{ij}$.

Processor 2 of slave helicopters $H_j$ perform the following:

$$\alpha_{ji} = C_i + \Theta_{ji}$$

$$\alpha_{ij} = C_j + \Theta_{ij}$$

$\epsilon$ is then calculated as follows:

$$\pi \pm \epsilon = \alpha_{ji} - \alpha_{ij}$$

If
$\epsilon \leq \epsilon_o$, averaging of the two measures
If
$\epsilon \leq \epsilon_o$, alarm
$\epsilon$ is then calculated as follows:

$$D_{ij} = D_{ji} \pm \epsilon$$

If
$\epsilon \leq \epsilon_o$ then $D_j = (D_{ij} + D_{ji})/2$ (average the distance measurements)
If
$\epsilon > \epsilon_o$, alarm The error in slave $H_j$'s position between $H_j$'s actual position A and $H_j$'s commanded position C is then calculated by projecting the error from $H_j$'s actual position A. A first error in distance, $\epsilon_r$, is projected along slave $H_j$'s heading $C_j$. A second error in distance, $\epsilon_l$, is then projected perpendicular to slave $H_j$'s heading $C_j$. $\epsilon_r$ and $\epsilon_l$ are calculated as follows:

$$\epsilon_r = R_j \cos(\alpha_{jc} - C_c) + L_j \sin(\alpha_{jc} - C_c)$$

$$\epsilon_l = R_j \sin(\alpha_{jc} - C_c) - L_j \cos(\alpha_{jc} - C_c)$$

Where:

$$R_j = D_j \cos(\alpha_j^* - \alpha_{jc}) - D_{jc}$$

$$L_j = D_j \sin(\alpha_j^* - \alpha_{jc})$$

$$\alpha_j^* = (\alpha_{ji} - \pi + \alpha_{ij})^*/2$$

*

—low-pass filtering to reduce measuring noise
The heading error, $\epsilon C$, is determined as follows:

$$\epsilon C = K_1 (C_j - C_c) + K_2 (C_j - C_i) + K_3 (\epsilon_l)$$

This order permits the term $\epsilon_l$ to be annulled. $K_1$ and $K_2$ are courses which permit the anticipation of the course development as a function of the separations measured between headings $C_j$ and $C_c$ and between heading $C_j$ and $C_i$. $K_3$ can depend on $|V_{pj}|$.

The speed error, $\epsilon V_p$, is determined as follows:

$$\epsilon V_p = K_4 (V_{pj} - V_{pc}) + K_5 (V_{pj} - V_{pi}) + K_6 (\epsilon_r)$$

Using errors $\epsilon C$ and $\epsilon V_p$, piloting orders are easily generated. The resulting piloting orders are sent to the autopilot or to the pilot so that the slave helicopter can fly to its commanded position and assume its commanded trajectory. If the piloting orders are supplied to the pilot, they may be supplied with a crossed needle indicator.

Therefore, according to the preferred embodiment, redundant relative position data is analyzed in the "data fusion" process to determine a reliable helicopter relative position. Then, depending upon the desired eventual position of helicopter in relation to the other helicopters in the formation, the helicopter calculates piloting orders for achieving the eventual desired position.

The present invention therefore achieves the objective of maintaining a tight formation spacing while at the same time providing for a predetermined margin of safety due to the applied rules of pilotability. A flexible system in which a variable number of helicopters can travel in a formation under various formations under various flight phases under conditions of poor visibility has been described.

While the invention has been described in connection with what is presently considered to be the most practical and preferred embodiments, it is to be understood that the invention is not limited to the disclosed embodiments but, on the contrary is intended to cover variations and modifications within the spirit and scope of the appended claims.

For example, additional indications of relative position and/or absolute position may be used in the "data fusion" process to render a reliable relative position output for the generation of piloting orders. Also, one specific calculation for the determination of position error and speed error is described above. Other algorithms for determining the error between such measured/relative information and such commanded information may be used.

Therefore, persons of ordinary skill in this field are to understand that all such equivalent methods of performing the "data fusion" process all such equivalent methods of determining the errors between measured/relative quantities and commanded quantities are included within the scope of the following claims.

I claim:

1. A system comprising a leader unit and a plurality of slave units, each leader unit and each of said plurality of slave units being contained in a separate aircraft, each aircraft having a position, a heading, a speed, and an altitude, the leader unit and the plurality of slave units comprising a formation,
   (A) said leader unit comprising:
   (i) transmitting means for transmitting leader messages, the leader messages containing leader measured unit position information;
   (ii) receiving means for receiving leader messages and slave messages, the slave messages containing slave measured unit position information;
   (iii) transmission direction and travelling time detection means, connected to the receiving means, for outputting the direction of slave messages and for outputting the time between transmission of a slave message and reception of the slave message; and
   (iv) processing means, connected to the transmission direction and travelling time detection means and connected to the transmitting means, for:
      (a) determining leader measured unit position information based on the output of the transmission direction and travelling time detection means, and
      (b) generating leader messages for transmission by the transmitting means to each slave unit, each leader message containing:
         the leader measured unit position information for a slave unit being transmitted to; and the heading, speed, and altitude of the leader unit, and a type of formation;

(B) each of said slave units comprising:

(i) transmitting means for transmitting slave messages;

(ii) receiving means for receiving leader messages and slave messages;

(iii) transmission direction and travelling time detection means, connected to the receiving means, for outputting the direction of a message and for outputting the time between transmission of the message and reception of the message; and (iv) processing means, connected to the transmission direction and travelling time detection means and connected to the transmitting means, for:

(a) determining slave measured unit position information based on the output of the transmission direction and travelling time detection means;

(b) performing a data fusion process to determine a relative position of the slave unit in the formation based on slave measured unit position information and based on leader measured position information;

(c) calculating piloting orders for causing the slave unit to achieve the position, heading, speed, and altitude deduced from the leader message; and (d) generating slave messages for transmission by the transmitting means to each unit, each slave message containing:
the slave measured unit position information for the unit being transmitted to in order that each unit is able to determine the relative position of every other unit.

2. The system of claim 1 wherein:

said leader unit further comprises:
independent relative position determining means, connected to said processing means, for outputting independent relative position information for each unit in the formation, and
wherein said transmitting means sends the independent relative position information to each slave unit; and each of said slave units further comprises:
independent relative position determining means, connected to said processing means, for outputting independent relative position information for each unit in the formation, and
wherein said processing means also utilizes the independent relative position information in performing the data fusion process.

3. The system of claim 1 wherein:

said leader unit further comprises:
absolute position determining means, connected to said processing means, for outputting absolute position information indicative of the absolute position of the leader unit, and
wherein said transmitting means sends the absolute position information to each slave unit; and each of said slave units further comprises:
absolute position determining means, connected to said processing means, for outputting absolute position information indicative of the absolute position of the slave unit, and
wherein said processing means also utilizes the absolute position information in performing the data fusion process.

4. The system of claim 3 wherein:

said leader unit further comprises:
flight phase outputting means for outputting flight phase information indicative of the current flight phase of the leader unit; and
wherein said transmitting means sends the flight information to each slave unit; and each of said slave units further comprises:
flight phase outputting means for outputting flight phase information indicative of the current flight phase of the slave unit; and
wherein said processing means receives the flight phase information and utilizes the flight phase information in performing the data fusion process.

5. The apparatus of claim 3 wherein:

the absolute position determining means of the leader unit generates figures of merit indicative of errors in the absolute position information; and said transmitting means sends the figures of merit relative to the absolute position information to each slave unit; and the absolute position determining means of the slave unit generates figures of merit indicative of errors in the absolute position information; and the processing means of the slave unit receives the figures of merit from the absolute position determining means and utilizes the figures of merit in performing the data fusion process.

6. The apparatus of claim 1 wherein:

the data fusion process generates figures of merit indicative of errors in the determining of said relative position of the slave unit, said figures of merit being sent by the transmitting means of the slave unit to the receiving means of each other slave unit.

7. The system of claim 1 further comprising:

a ground station for transmitting ground messages to said leader unit, and for receiving leader messages from said leader unit, the ground messages containing ground measured position information indicative of the position of the leader unit as measured by the ground station;

wherein said leader unit transmits leader messages to the ground station and said leader unit receives ground messages from the ground station, the leader messages containing leader measured position information indicative of the position of the ground station as measured by the leader unit; and wherein the leader unit determines the relative position of the ground unit based on the ground measured position information and based on the output of the direction and travelling time detection means.

8. The system of claim 1 wherein:

said leader unit further comprises:
a synchronization clock, connected to the processor means of the leader unit, for determining when leader messages are generated for transmission by the transmitter means and for determining when received messages were transmitted;

each of said slave units further comprises:
a synchronization clock, connected to the processor means of the slave unit, for determining when slave messages are generated for transmission by the transmitter means and for determining when messages received by the slave units were transmitted; and wherein said leader unit periodically transmits synchronization information in a leader message, the slave units synchronizing their clocks upon reception of the synchronization information such that the synchronization clocks of the slave units are synchronized with the synchronization clock of the leader unit.

9. The system of claim 8 wherein:

each unit in the formation transmits messages at predetermined times in a predetermined sequence such that only one unit transmits at a time, the predetermined times being relative to the synchronization clock of the leader unit.

10. The system of claim 1 wherein:

the processing means of the slave unit utilizes predetermined laws of pilotability in calculating piloting orders, the laws of pilotability define permissible piloting orders for a given spatial relationship between units in the formation.

11. The system of claim 10 wherein:

each of said slave units further comprises:
an autopilot for controlling the movement of the slave unit based on the piloting orders.

12. The system of claim 10 wherein:

each of said slave units further comprises:
a display means for indicating the piloting orders to a pilot of the slave unit.

13. The system of claim 1 wherein:

said transmitting means of both said leader unit and said slave units further comprises:
a differential phase key shifting encoder for encoding said messages generated by the processing means into differential phase key shifted encoded messages and for outputting the encoded messages to the transmitting means; and said receiving means of both said leader unit and said slave units further comprises:
a differential phase key shifting decoder for decoding differential phase key shifted encoded messages received from the receiver means and for outputting the decoded messages to the processing means.

14. The system of claim 1 wherein:

said transmitting means of both said leader unit and said slave units are spread spectrum transmitters;

said receiving means of both said leader unit and said slave units are spread spectrum receivers for receiving from the spread spectrum transmitters.

* * * * *